(12) United States Patent
Brown

(10) Patent No.: US 11,840,005 B2
(45) Date of Patent: Dec. 12, 2023

(54) DEVICE AND METHOD FOR MORE EFFICIENT SIZING OF A COMPLEX EXTRUDED PLASTIC PROFILE

(71) Applicant: Innovative Plastic Products, Inc., Maineville, OH (US)

(72) Inventor: Randall J. Brown, Cincinnati, OH (US)

(73) Assignees: Innovative Plastic Products, Inc., Maineville, OH (US); Innovative Plastic Products, Inc., Maineville, OH (US)

( * ) Notice: Subject to any disclaimer, the term of this patent is extended or adjusted under 35 U.S.C. 154(b) by 522 days.

(21) Appl. No.: 16/571,437

(22) Filed: Sep. 16, 2019

(65) Prior Publication Data

US 2020/0130247 A1    Apr. 30, 2020

Related U.S. Application Data

(60) Provisional application No. 62/753,049, filed on Oct. 30, 2018.

(51) Int. Cl.
| | |
|---|---|
| *B29C 48/88* | (2019.01) |
| *B29C 48/90* | (2019.01) |
| *B29C 48/12* | (2019.01) |
| *B29L 31/00* | (2006.01) |

(52) U.S. Cl.
CPC ............ *B29C 48/911* (2019.02); *B29C 48/90* (2019.02); *B29C 48/12* (2019.02); *B29L 2031/001* (2013.01)

(58) Field of Classification Search
CPC ........ B29C 48/90; B29C 48/911; B29C 48/12
See application file for complete search history.

(56) References Cited

U.S. PATENT DOCUMENTS

| | | | | | |
|---|---|---|---|---|---|
| 4,120,926 | A | * | 10/1978 | Titz .................... | B29C 48/11 264/237 |
| 4,185,396 | A | * | 1/1980 | Haisser ................ | B29C 48/908 165/104.16 |
| 5,474,722 | A | * | 12/1995 | Woodhams ............ | B29C 48/10 264/108 |
| 6,779,994 | B2 | * | 8/2004 | Krumbock ............ | B29C 48/903 264/209.3 |
| 7,708,539 | B2 | * | 5/2010 | Gruber .................. | B29C 48/90 425/384 |

(Continued)

*Primary Examiner* — Seyed Masoud Malekzadeh
(74) *Attorney, Agent, or Firm* — Jenei LLC

(57) ABSTRACT

Plastic profile extrusion system includes an extrusion die that pre-forms a hot, unfrozen plastic profile shape. Cooled calibration device receives the hot plastic in a longitudinal cavity through the calibration device to conductively cool the plastic as it holds the plastic profile to size and dimensions. For plastic parts with channels, inside corners, or other difficult to cool sections, the calibration device would require a metal ridge to hold the shape of that channel or corner as the heat is conducted from the hot plastic through the metal ridge into the body of the calibration device. This invention replaces metal ridges that hold the shape of the plastic profile during cooling in at least part of the calibration device with fluid cooling passages that communicates with the moving portion of the plastic profile and cooling medium to fill the flow passages to extract heat from the plastic material.

9 Claims, 10 Drawing Sheets

(56) References Cited

U.S. PATENT DOCUMENTS

2015/0306804 A1\* 10/2015 Valdmaa ................ B29B 7/007
       428/318.6
2020/0130247 A1\* 4/2020 Brown ................... B29C 48/12

\* cited by examiner

DEVICE AND METHOD FOR MORE EFFICIENT SIZING OF A COMPLEX EXTRUDED PLASTIC PROFILE

CROSS-REFERENCE TO RELATED APPLICATIONS

The present Application for Patent claims priority to U.S. Provisional Application No. 62/753,049 entitled "DEVICE AND METHOD FOR MORE EFFICIENT SIZING OF A COMPLEX EXTRUDED PLASTIC PROFILE" filed 30 Oct. 2018, which is hereby expressly incorporated by reference herein.

BACKGROUND

1. Technical Field

The present disclosure relates in general to plastic profile extrusion, and more particularly to calibrators using in plastic profile extrusion.

2. Description of the Related Art

Plastic profile extrusions are generally known and are commonly used for many applications due to their economical solution for providing value in many applications. Although the current invention is not limited to complex window lineal profiles, since that is where it is most useful, the discussion will focus on these profiles. During the extrusion of a plastic profile, the hot plastic is pushed by the extruder through a hot shaping die to give the fluid material the approximate shape of the final part. The hot, fluid plastic exiting the extrusion die must be captured by some sort of calibration device to hold the soft, unfrozen material in the desired shape as it continuously moves down the extrusion line and is cooled to below the plastic material melt temperature or glass-transition temperature ($T_g$) and freezes to become solid. The plastic profile must be completely formed and solid prior to the Haul-off which pulls the part through the process at a continuous rate. After the haul-off, the part is cut to length by the saw. The primary function of the calibration tooling is to conductively cool the plastic as it holds the size and shape of the profile. Historically many techniques have been used to hold and cool, i.e., calibrate the plastic profile, however, the focus of the present disclosure is with the current state of the art for calibrating complex profiles such as those for vinyl window frame, sash, and other complex window profiles, also called lineals.

The current state of the art is to utilize a first metal calibrator that initially contacts the hot plastic extrudate from the die. The metal of this first calibrator must be cooled sufficiently so that the hot plastic does not stick to the metal and stop the continuous process at this point. The cooled metal also freezes the skin of the part by conduction to form a uniform and consistent surface appearance on the final part. This frozen skin of the part also provides sufficient strength for the Haul-off to pull the part through the remaining calibration tooling. This first calibrator is often called a Dry Calibrator because no water touches the part at this point of the process. Stainless steel is most often used to significantly extend the life of the calibrator because the moving plastic is very abrasive and can cause unacceptable wear in softer metals such as Aluminum. Although the higher heat transfer coefficient of Aluminum is desirable for cooling the plastic, the excessive wear precludes it from being used in a high-volume production tool. The calibrator is generally assembled from plates of the metal with the desired profile shape cut as a longitudinal cavity into each plate in order to make assembly of the calibrator easier.

A first channel or longitudinal cavity that matches the size and shape of the desired plastic part is most often cut through the metal plates by wire electrical discharge machining (EDM) which is a very accurate method of cutting the complex shape needed to hold the plastic part to the tight tolerances required for many parts. It is critical that the passageway through the calibrator matches the desired final shape of the part because it is the metal of the calibrator that defines the shape of the final part. If there is a channel in the plastic profile, then there must be a corresponding metal ridge to fill that channel and hold the dimensions of that channel. For the purposes of the present disclosure, a metal ridge in the calibrator is defined as a projection, extension, or flange of the metal calibrator that extends into an interior channel or cavity of the plastic profile intended to hold that channel open to the desired dimensional tolerance. A second channel or slot is usually milled into one face of the wire EDM cut plate in order to introduce partial vacuum to the plastic part to hold it against the metal surface. Most complex plastic profiles are hollow to only utilize as little material as is needed for the application and it is the outside dimensions of that hollow shape that are critical. The partial vacuum applied to the profile promote contact with the calibrator and establish the exterior size and dimensions of the profile. Contact with the metal of the calibrator conducts heat from the plastic profile into the metal calibrator. Very small calibrators can be immersed in water to keep the calibrator cooled, however most calibrators require a third set of channels to be cut into the metal plates to allow for coolant, usually water to be circulated through the calibrator to keep it cool so that the plastic doesn't stick to the metal and to improve cooling of the extruded plastic.

Since the primary purpose of the calibrators is to hold the plastic profile in shape and to the tight dimensional tolerances required as it is being cooled, the length will vary with the line speed, the complexity of the profile, and the required dimensional tolerance of the part. Calibrators are typically built in sections of 4 to 15 inches in length for ease of manufacture and handling. Metal plates of a convenient thickness are used to assemble the calibrator, so if plates of 1" thickness are used, then 4 to 15 of them are bolted together to form one calibrator. Calibrators are then used in sets to achieve the needed length so that the plastic profile is sufficiently cooled and frozen to below the Tg of the material prior to exiting the calibrator. Sometimes only Dry calibration is utilized, however, a combination system utilizing a water tank under partial vacuum following one or more Dry calibrators is more often used. This method involves a Dry calibrator that is long enough to freeze some of the plastic, such as the skin in contact with the metal of the calibrator. After the partially frozen profile exits the first dry calibrator the profile enters an enclosed water tank under partial vacuum with calibration plates that continue to hold the part securely in shape while even the most difficult sections of the part are cooled to below the Tg and are frozen in shape. Gruber et al, in U.S. Pat. No. 7,708,539 ("Gruber et al."), which is hereby incorporated by reference, describe this method of using a dry calibration apparatus and a cooling tank. Sizing plates that are basically the same as the wire EDM plates of the calibrator are spaced in the water tank to allow water flow completely around the profile to improve cooling while the plates continue to hold the profile shape. The partial vacuum continues to hold the hollow profile against the longitudinal cavity in the sizing plates.

This combination method allows an improvement in overall cooling efficiency and therefore significantly higher rates than with Dry calibrators alone.

The water tank is one method of Wet calibration that can be utilized without an initial Dry calibrator setting the initial dimensions, however, it is often insufficient at controlling the tight tolerances required of many complex profiles. Again, a short 4" for example, Dry calibrator can be used at the entrance to the water tank for an economic system with reasonable control of dimensions. Another variation of a Wet calibration system introduces water into the calibrator to actually contact the part. This is typically done by alternating the use of the slots cut into the face of the calibration plates. The first slot as the plastic enters the calibrator would be a vacuum slot that pulls the part against the metal of the calibrator and also draws off any water leaking back from the second slot where cooling water is introduced into contact with the plastic profile. The third slot would apply partial vacuum to draw off the water introduced in the second slot. A forth slot would introduce more water that would be drawn off by the partial vacuum applied by the fifth slot, and so forth. This method significantly improves the overall cooling efficiency of the calibrator. One example of this method is given by Titz in U.S. Pat. No. 4,120,926 ("Titz"), which is hereby incorporated by reference. This method does allow for the selective cooling of sections that require faster cooling, however contrary to the current invention this method still depends on the metal ridges running the entire length of the calibrator to set the size of any channels in the plastic profile.

The design of the calibrator is critical because holding the plastic profile to shape as it cools moving down the extrusion line is most often the controlling factor in the output rate that can be achieved. The current state of the art is to build the calibrator long enough so that even the very hardest sections of the plastic profile to cool are completely frozen and cannot shrink and distort the part. Many techniques have been used that try to improve the cooling efficiency of the calibrator. Inserts of Aluminum or Beryllium Copper are sometimes added below the stainless-steel surface in critical areas of the calibrator such as inside corners that are harder to cool in order to improve the cooling rate. Gruber et al, describe in U.S. Pat. No. 7,258,540 ("Gruber") a method to introduce more cooling into a metal ridge of a calibrator by putting a cooling channel inside a longitudinal groove. However, the metal ridge is continued through the entire length of the calibrator to control the inside dimension of the channel in the profile. One technique has been developed where a relatively thin skin of stainless steel for wear resistance is made that is in contact with the moving plastic and is surrounded by Aluminum as the body of the calibrator to improve the heat transfer from the plastic. Krumbock et al. in U.S. Pat. No. 6,779,994 ("Krumbock"), which is hereby incorporated by reference, allows for gaps in the calibrating device inside the vacuum tank to allow the cooling fluid to contact the plastic profile to improve cooling. This allows for selectively cooling some sections more efficiently than others but is limited because it only occurs inside the cooling tank, does not allow high velocity cooling media, and still relies on the metal ridge inside the channel to hold the part to shape.

Since plastic profile extrusion is a continuous process the length is proportional to time at a given output rate. The cooling time required is set by the heat content of the material, the thermal conductivity of the material, and the heat transfer coefficient of the system. To increase the output rate for a given material and system the length of cooling must be increased. The length can be increased by adding additional calibration sections to increase line speed, however, drag is proportional to the surface contact between the profile and the metal of the calibrator. As the complexity of the plastic part to be produced is increased the amount of surface area per linear foot of the profile increases. Increasing drag requires stronger pullers to pull the part through the calibrator and increases the sensitivity of the process to small variations that often occur. At some point in increasing length and therefore drag, the force to pull the part through the calibrator will exceed the strength of the plastic profile being produced and break it, stopping the process.

In addition to the drag on the part increasing with the complexity of the plastic profile due to higher surface area per linear foot, there is also increased drag due to geometric complexity and aggravated even more by uneven cooling. For example, typical small channels in a vinyl window sash member are added to the design in order to allow the insertion of a glazing bead to hold the glass in the sash member and to add sealing members to help reduce air infiltration when the window is constructed. These channels are so small that it is extremely difficult to utilize the internal cooling technology disclosed by Gruber. It is obvious that the metal ridge in this section must remain in the channel until this channel is frozen and will no longer shrink or distort the dimensions of the channel. However, there is relatively poor heat transfer from the inside of the channel through the small cross section of metal ridge connecting the channel to the rest of the cooled calibrator resulting in the inside of this channel taking longer to cool than the rest of the part. The slower cooling results in shrinking of the inside of the channel attempting to close in the channel which applies more pressure on the metal surface area inside this channel resulting in even higher drag force needed to pull the plastic profile through the calibrator. This heat transfer rate determines the time to cool the part and to hold that channel open to the proper tolerance. Since the length of the calibrator is set either by cost or drag constraints the linear rate is thus determined by the time for this section to cool even though the rest of the part may cool faster and could therefore run faster.

BRIEF SUMMARY

In accordance with the teachings of the present disclosure, a calibration device includes a calibration body having a longitudinal cavity that is shaped to receive, maintain the shape of, and to conductively cool an unfrozen plastic profile that passes through the longitudinal cavity. The calibration device includes a fluid cooling passage formed in the calibration body and having a portion that communicates with the longitudinal cavity, exposing a surface of the unfrozen plastic profile with cooling fluid to freeze the surface of the profile. The calibration devices includes an input fluid cooling port that receives the cooling fluid that passes through the fluid cooling passage. The at least partially frozen plastic profile exits the longitudinal cavity being drawn by a haul off system.

In accordance with embodiments of the present disclosure, a plastic extrusion system includes an extrusion die that extrudes unfrozen plastic as an unfrozen plastic profile. The plastic extrusion system includes a source of pressurized cooling fluid. The plastic extrusion system includes a calibration device. The calibration device includes a calibration body having a longitudinal cavity that is shaped to receive, maintain the shape of, and to conductively cool an unfrozen plastic profile that passes through the longitudinal cavity.

The calibration device includes a fluid cooling passage formed in the calibration body and having a portion that communicates with the longitudinal cavity, exposing a surface of the unfrozen plastic profile with cooling fluid to freeze the surface of the profile. The calibration device includes an input fluid cooling port that receives the cooling fluid that passes through the fluid cooling passage. The plastic extrusion system includes a haul off system that draws the at least partially frozen plastic profile through the longitudinal cavity.

According to illustrative embodiments of the present disclosure, a method of making an extruded plastic part is provided. In one or more embodiments, the method includes extruding unfrozen plastic through a profile extrusion die. The method includes receiving the unfrozen plastic profile in a longitudinal cavity through a calibration body. The longitudinal cavity maintains the shape of, and conductively cools the unfrozen plastic profile. The method includes directing a cooling fluid through a fluid cooling passage formed in the calibration body and having a portion that communicates with the longitudinal cavity, exposing a surface of the unfrozen plastic profile with cooling fluid to freeze the surface of the profile. The method includes drawing the at least partially frozen plastic profile through the longitudinal cavity.

The above presents a general summary of several aspects of the disclosure in order to provide a basic understanding of at least some aspects of the disclosure. The above summary contains simplifications, generalizations and omissions of detail and is not intended as a comprehensive description of the claimed subject matter but, rather, is intended to provide a brief overview of some of the functionality associated therewith. The summary is not intended to delineate the scope of the claims, and the summary merely presents some concepts of the disclosure in a general form as a prelude to the more detailed description that follows. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
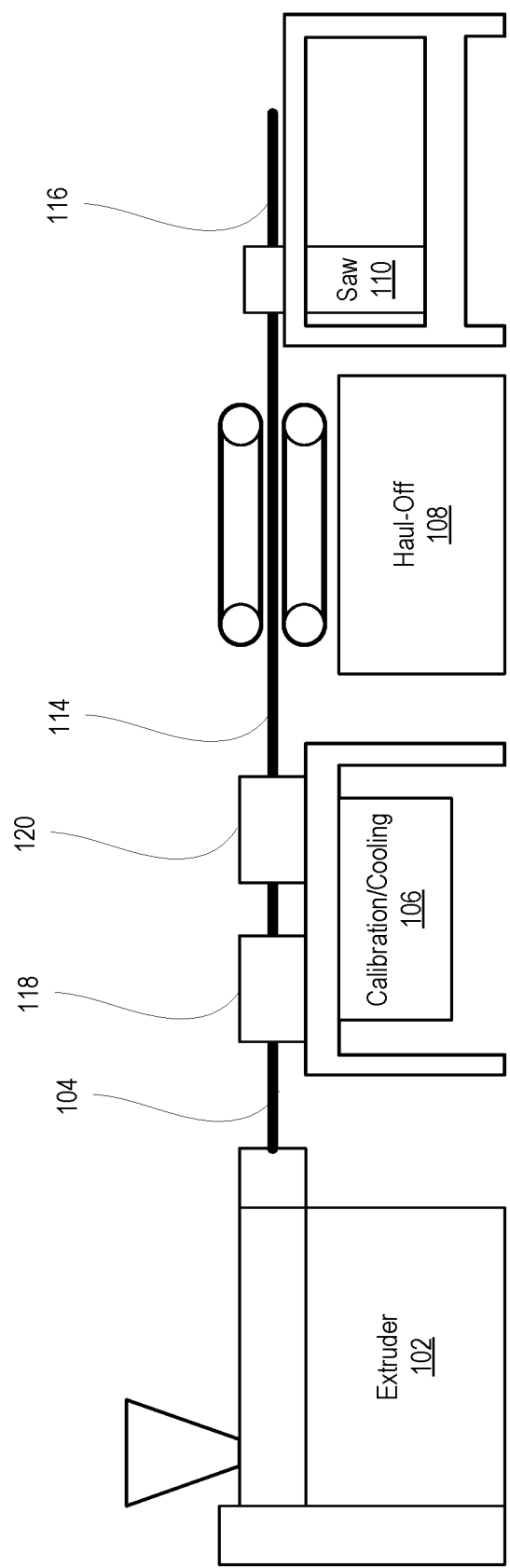
FIG. 1 is a schematic drawing of a typical profile extrusion line.

An exemplary embodiment of the invention relates to a device for holding a complex plastic profile to shape as it cools in the extrusion process. A calibration device is defined as the stationary tool that captures the hot, fluid plastic exiting from a profile extrusion die with the purpose of holding and controlling the shape and dimensions of the plastic material as it moves through the tool in the continuous profile extrusion process.

In one or more embodiments, the device includes a calibrating body having a first channel or passageway extending longitudinally there through which has a cross-sectional size and shape of the plastic profile to be sized in the device. The calibrating body includes a second set of channels or slots to draw a partial vacuum to hold the plastic against the metal passageway to facilitate holding the fluid plastic material to the desired shape as it cools. The calibrating body also includes a third set of channels so that cooling media can be circulated through the calibrating body to remove the heat being transferred from the hot plastic into the metal of the calibrating body. Depending on the shape of the plastic profile to be produced, certain sections of the passageway may be more difficult to conduct heat out of the plastic material.

A cooling efficiency ratio (CER) can be defined as the smallest area of metal that the heat from a unit area of plastic material must travel through to get to a cooling channel. In a round pipe or simple rectangle, each section of the outside of the profile has direct access to the cooled metal of the calibration device—the surface area of the plastic equals the surface area of the cooled metal for a CER=1. An example of a lower CER would be a U channel with each section of the U channel being 1 unit long. The outside of each of the three legs would still have direct access to cooling for a CER=1. However, the heat inside of each of the three legs must travel through the 1 unit opening of the top of the U for a CER=⅓=0.333. It is obvious that any value less than one is undesirable resulting in the plastic material cooling at different rates and shrinking at different times that can distort the shape of the part. Maintaining the metal ridge of the calibrator inside sections with a low CER such as the example U channel can still hold the part to shape until it is completely cooled. Based on experience in the industry and the alternate solutions to this problem provided by prior patents, sections of the profile that have a CER estimated at 0.25 or below cause sufficient problems to justify alternate methods although the typical solution is to slow the rate to give the heat sufficient time to transfer through the metal ridge of the calibrator as the ridge maintains the size or gap. An exemplary embodiment of the invention is when the channel of the profile shape is sufficiently small to make heat transfer through the metal ridge extending into that channel excessively difficult or slow, a CER less than 0.25 for example, that metal ridge of the calibrating body is replaced by cooling media moving at a velocity sufficient to remove heat from the plastic at least as fast as the heat is transferred from outside walls of the plastic profile into metal surface of the calibrator. This present disclosure provides changing the method of holding a channel in a complex plastic profile open to the proper dimension. Rather than utilizing a metal ridge to keep the plastic channel open to the correct dimension, the present disclosure utilizes the novel approach of using a cooling fluid to control the shape and dimensions of the plastic channel by selectively cooling the inside of the channel faster so that the shrinkage of the plastic material will tend to open the channel against the metal of the calibrator outside of the plastic channel.

Another exemplary embodiment of the invention relates to a system for selectively changing the method of cooling of a complex plastic profile in a calibration device for certain sections that are more difficult to cool than the outside surfaces in order to increase the cooling efficiency in those sections. This method provides for the replacement of metal ridges in sections of a calibrator that are inside a channel in the plastic profile that is sufficiently small to make heat transfer through the metal ridge out of that channel excessively difficult or slow and replacing that metal ridge with cooling media. The cooling media is introduced into the open cavity between the calibration device and the unfrozen plastic profile at a location in the flow direction inversely proportional to the difficulty in cooling that section of the part—the more difficult the cooling, the earlier in the calibrator the cooling media is introduced. For example, a section with a CER equal to 0.1 may rely on the metal ridge for 10% of the initial length of the calibration device and utilize the fluid cooling passage in the remaining 90% of the calibration length, whereas a section of the profile with a CER equal to 0.5 may rely on the metal ridge for 50% of the calibration device and utilize the fluid cooling passage in the remaining 50% of the calibration length. The cooling media increases the efficiency of cooling in that section of the plastic profile that is more difficult to cool and becomes the method of controlling the size and shape of the plastic channel because it cools the inside first, then as the outside cools the channel will want to open out against the metal of the calibrator controlling the outside of the plastic channel. This also balances out the rate of cooling for the entire profile and should allow an overall increase output rate because the rate is determined by the slowest cooling section of the profile.

For the purposes of the present disclosure, a metal ridge in the calibrator is defined as a projection, extension, or flange of the metal calibrator that extends into an interior channel or cavity of the plastic profile intended to hold that channel open to the desired dimensional tolerance.

The present disclosure provides a method for the production of a plastic profile extrusion utilizing a different calibrator design that allows for more efficient sizing of complex shapes by applying more efficient cooling where needed. This also results in lower drag caused by less contact with the sizing calibrator which can allow for higher linear manufacturing rates. The method comprising the replacement of the metal ridges in strategic locations within the sizing calibrator with fluid cooling passages to allow for coolant streams, preferably in turbulent flow. This high velocity cooling fluid replaces the function of the metal ridges in the calibrator by improving the heat transfer from the plastic material and freezing the interior of the channel to shape earlier in the process.

The present disclosure relates to a method for manufacture of plastic profile extrusions and is specifically directed to an improved method of differential cooling complex plastic profiles where critical tight tolerances often restrict the linear rate of manufacture.

Although the present disclosure and the problem on which it is based can be applied to any plastic profile shape, they will be described with respect to the production of rigid polyvinyl chloride lineals that comprise frame, sash, jamb, sill, and other complex parts used in the manufacture of vinyl windows.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

FIG. 1 illustrates a profile extrusion line 100 that includes an extruder 102 that extrude hot, fluid plastic 104 that is processed sequentially by a calibration/cooling device 106, a haul-off section 108, and a saw 110. Hot, fluid plastic exiting extrusion die 112 of extruder 102 must be captured by some sort of calibration/cooling device 106 to hold the soft material in the desired shape as it continuously moves down the extrusion line 100 and is cooled to below the plastic material $T_g$ or melt temperature and becomes solid. A plastic profile 114 must be completely formed and solid prior to the Haul-off 108 which pulls the plastic 104 through the process at a continuous rate to become a part 116. After the haul-off section 108 the part is cut to length by the saw 110.

In one or more embodiments, the calibration/cooling device 106 includes a dry calibrator 118 that is followed by a wet calibrator 120. Unlike generally-known dry calibrators, the calibrator 118 according to the present disclosure can have more uniform cooling of complex parts that can allow reduced longitudinal length and less drag, yet achieving the desired shape at a given output rate or allow higher output rates with the same longitudinal calibrator length.

Like most materials, plastics shrink when cooled but at a much greater rate than other traditional materials such as metals. The coefficient of thermal expansion (CoE) is a reversible material property and can be measured for any material in question. Since the focus will be on vinyl window lineals the values for rigid PVC (vinyl) will be used as the example. The CoE for a typical rigid PVC used for vinyl window lineals is 0.000035 inches per inch per degree Fahrenheit up to the Tg of the polymer which is about 165° F. As an example, a 1" strip that is cooled from 165° F. to 65° F. (100°) will shrink 0.0035". However, the CoE changes above Tg to the larger value of 0.00015 inches per inch per degree Fahrenheit and this is the value that is important when considering cooling of the plastic profile from the extruded melt at a typical temperature of 380° F. down to room temperature. The same 1" strip from above that is cooled from 365° F. to 165° F. (200°) will shrink 0.030". Simple shapes, such as a pipe, tube, or flat strip can be cooled uniformly and so the entire shape shrinks uniformly. Therefore, the high CoE of plastics does not readily affect processing. However, when a complex profile does not cool uniformly, one section can cool and freeze then as another section cools, it shrinks and applies a stress on the part. An illustration of this is when a flat strip of plastic is extruded and cooled very quickly on one side with water and the other side is allowed to cool slowly in air. The flat strip will bow or curl in the direction of the slower cooling as it shrinks and pulls the flat strip into a crescent shape. This can be predicted and calculated based on the CoE of the material and the differential cooling rates.

Figure 2:
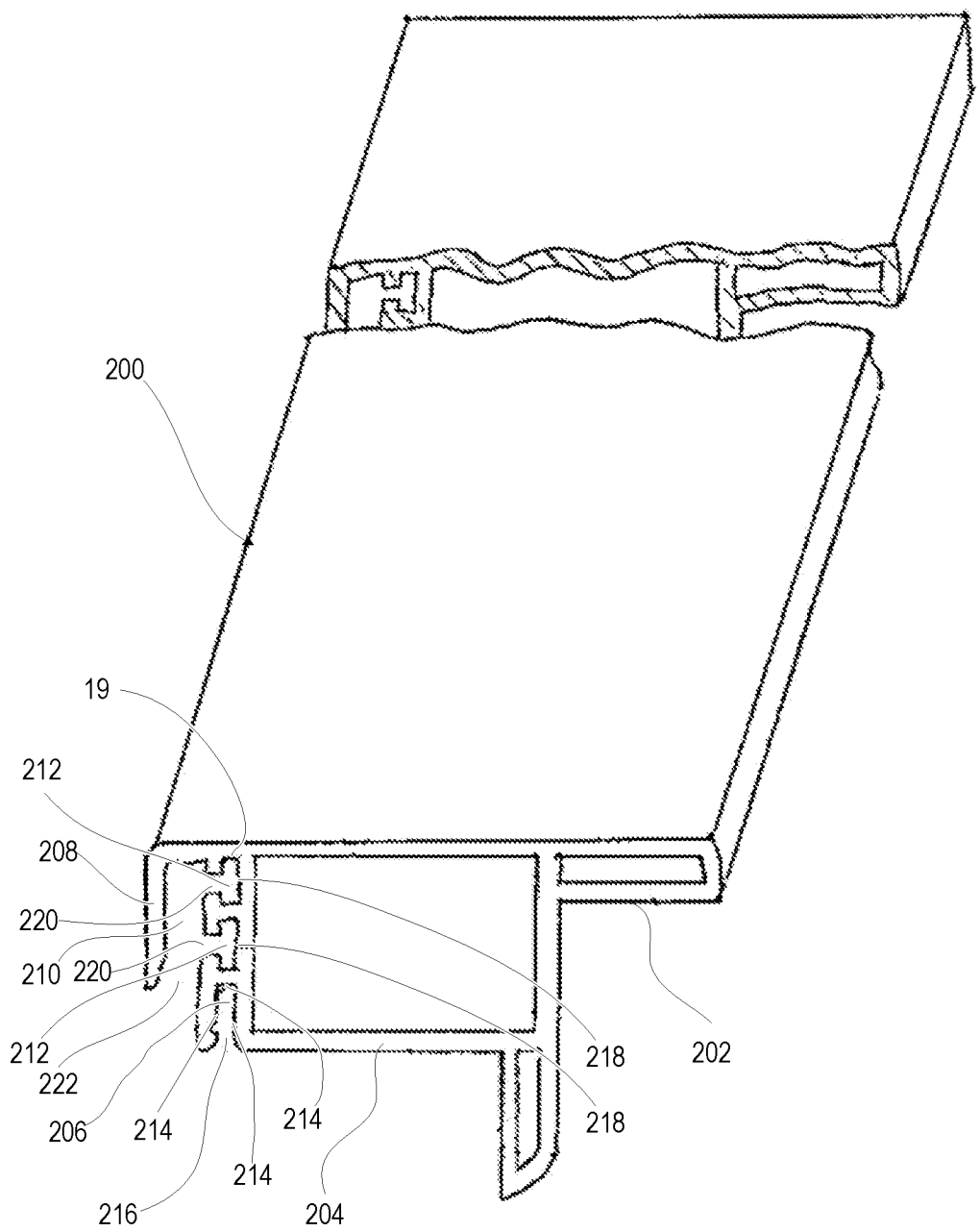
FIG. 2 is a perspective view of a typical window sash member showing a tight first channel for accepting a glazing bead and additional second channels for accepting weather sealing strips.
Figure 5:
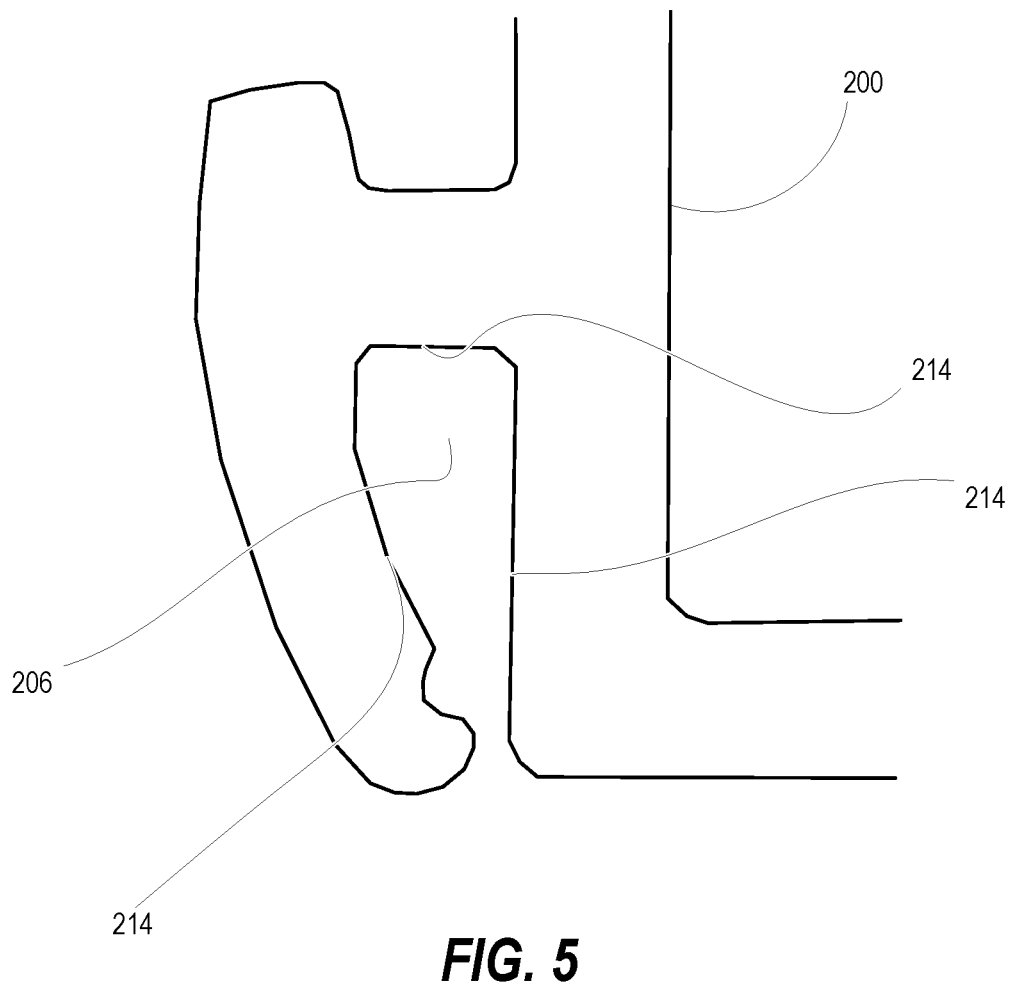
FIG. 5 is an end view of what the tight glazing bead channel in the window sash member of FIG. 2 would look like when the part exits the small metal ridge holding that channel open prior to the complete cooling of the part.

The next example is a U channel exemplified by the glazing bead channel 206 of the sash in FIG. 2 where it is more difficult to cool the inside of the U than the outside. If the outside is cooled quickly and inside cools at a slower rate, the inside of the shape will shrink and pull the U shape closed on itself to a degree proportional to the CoE of the material and the differential cooling rates. The result will be a distorted profile 200 as shown in FIG. 5. The conflict between this phenomenon and the need to cool a complex plastic profile are explained in the prior art section.

FIG. 2 shows a typical sash profile 200 as an example of a vinyl window lineal that would be used as the top rail in the bottom window of a double hung window. Lifting rail 202 would be where one would lift this top rail to open the bottom window in a double hung style window. Surfaces 204 abut the glazing of the window when installed. The glazing bead channel 206 is made to receive a glazing bead (not shown) that would form the third side of the channel that holds the window glazing in position in this sash member. Flange 208 forms another channel 210 that is made to receive a similar flange on the bottom sash rail of the top window of the completed double hung window. The insertion of each flange into the opposing channel provides additional strength to the window when closed. Two additional channels 212 are provided to each accept a weather sealing strip to provide a seal against air infiltration through this operating joint in the window. These channels are used to illustrate the difficulty with cooling a complex shape that is often made by profile extrusion. All of the heat contained in the glazing bead channel section of the plastic profile must transfer through surface area 214 into the metal ridge of the calibrator filling channel 206 and then be transferred through the small gap 216 at the mouth of channel 206. This would yield a very poor CER of about 0.14. In a similar way, all of the heat contained in the channels 212 to receive the weather sealing strips must transfer through surface area 218 into the metal ridge of the calibrator filling channels 212 through the small gaps 220 and then through the small gap 222 at the mouth of channel 210. This would yield a very poor CER of about 0.10.

Figure 3:
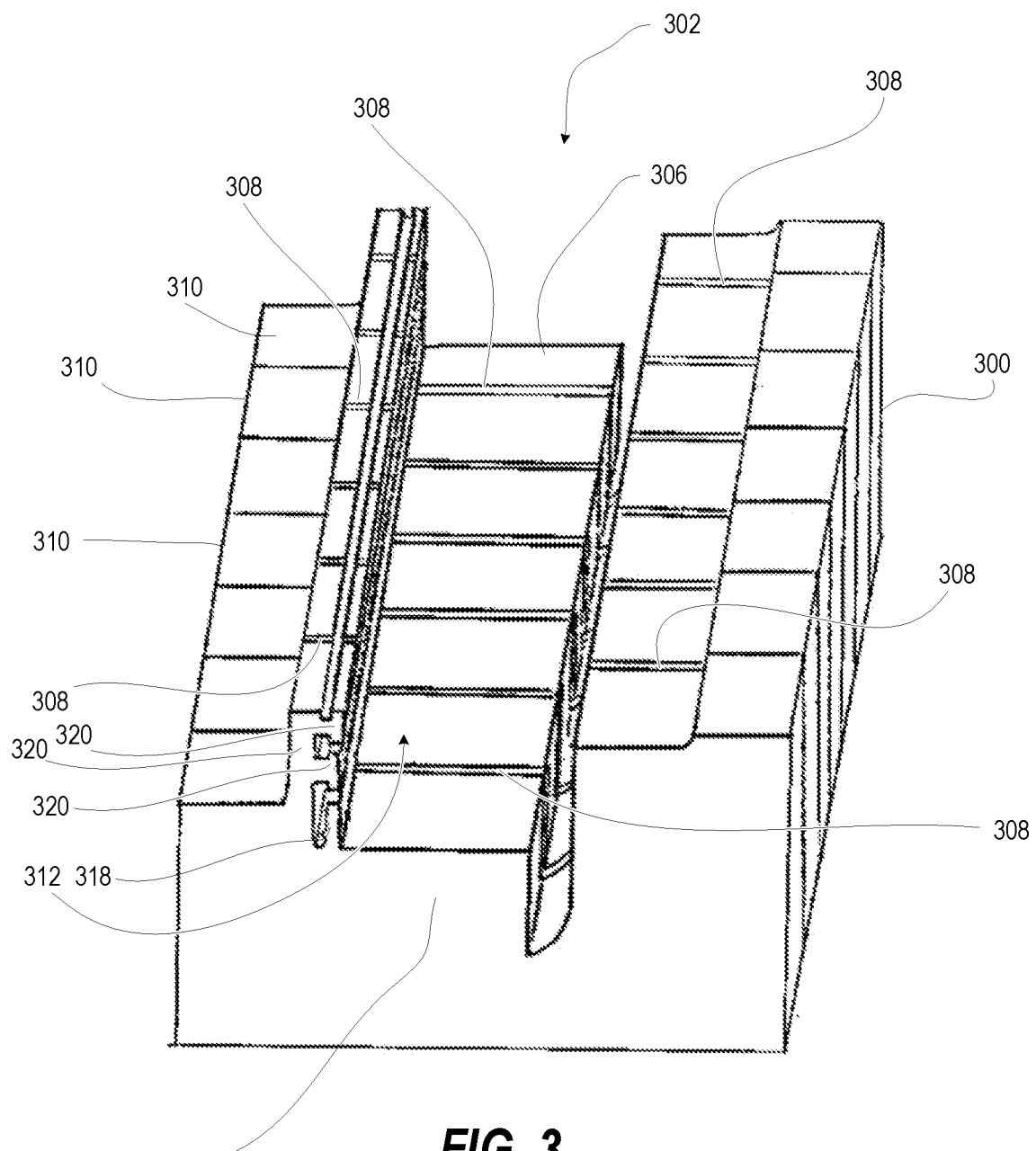
FIG. 3 is a perspective view of the bottom half of a calibrator built with prior art to shape the sash member shown in FIG. 2.

FIG. 3 illustrates a generally-known bottom half 300 of a calibrator 302 that would be used to size the typical sash profile 200 (FIG. 2). Only the bottom half 300 is shown for clarity while the top half would be attached to the bottom half to complete the passageway there through having the cross-sectional size and shape of the sash member profile. The hot plastic profile would enter from a rear 306 where the partial vacuum would pull the plastic into contact with the metal of the calibrator 302 to be sized in the passageway and exit at the front 304. Slots 308 are cut in a cross-flow direction to allow a partial vacuum to be applied to hold the cooling plastic against the metal surfaces of the calibrator. This calibrator is built with seven individual metal plates 310 and assembled. The dowels for alignment and bolts to hold the calibrator together are not shown.

Figure 4:
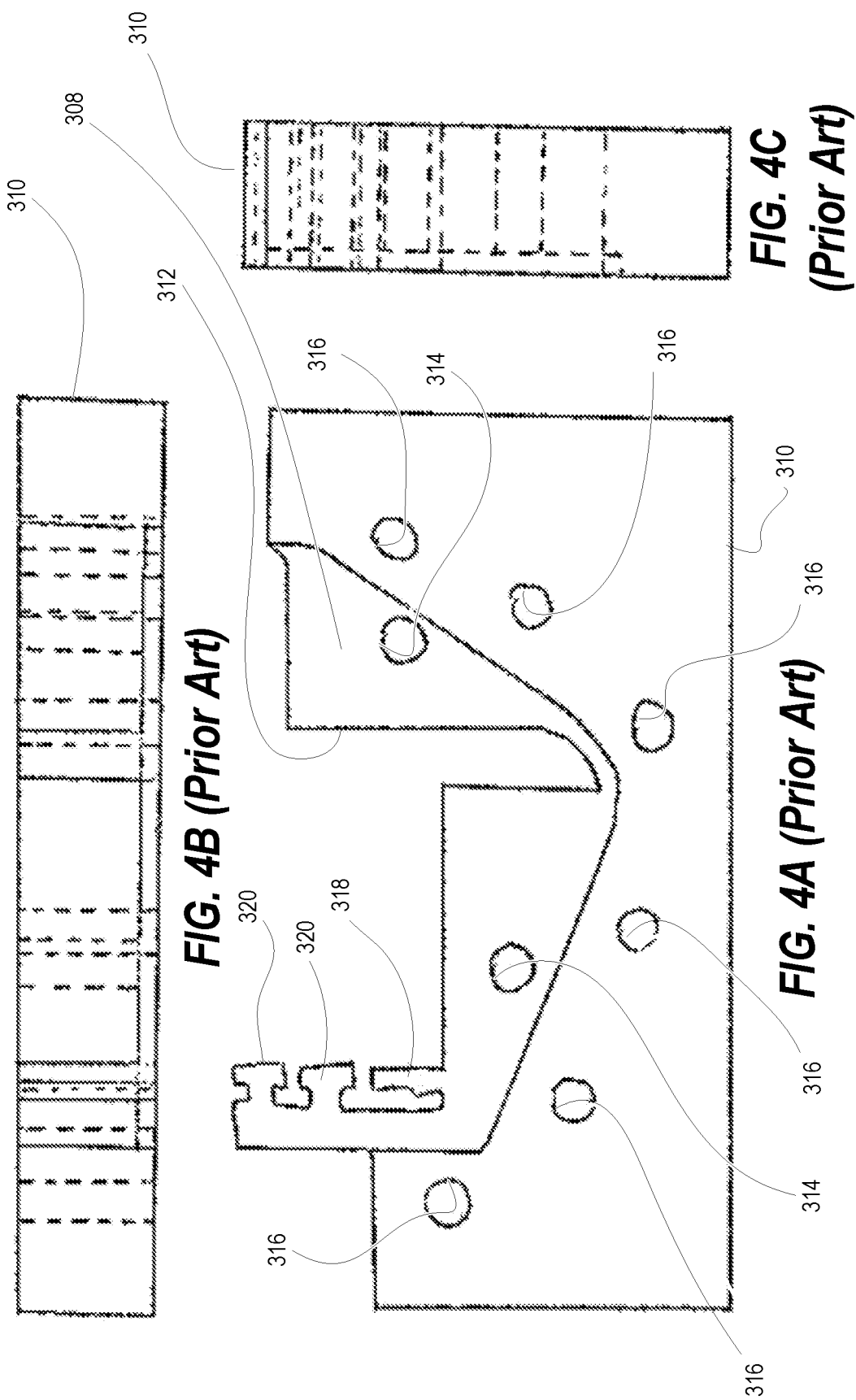
FIG. 4A is a front elevational view of one metal plate that is used to assemble the calibrator of FIG. 3.
FIG. 4B is a top elevational view of one metal plate that is used to assemble the calibrator of FIG. 3.
FIG. 4C is a side elevational view of one metal plate that is used to assemble the calibrator of FIG. 3.

FIGS. 4A-4C illustrate an elevational view of one metal plate 310 that is used to assemble the bottom half 300 of the calibrator 302 of FIG. 3. With particular reference to FIGS. 3 and 4A, there is a passageway 312 that matches the size and shape of the sash member in FIG. 2. FIG. 4A illustrates vacuum slots 308 that are cut into one face of the metal plate 310 and are connected to channels 314 that connect to a vacuum fitting on the outside of the calibrator (not shown). Cooling channels 316 are cut into the metal plate 310 to allow cooling medium to flow through the plate and calibrator to extract the heat from the plastic profile and are connected to cooling fittings on the outside of the calibrator (not shown). Metal ridge 318 forms part of the passageway 312 to hold the corresponding channel 206 in the profile 200 (FIG. 2) to the correct dimensional size. Likewise, metal ridges 320 form part of the passageway 312 to hold the corresponding channels 212 in the profile 200 (FIG. 2) to the correct dimensional size.

Due to the difficulty of transferring heat from a large surface area of the hot plastic profile through a small cross-sectional area of metal ridge that forms the gap in a channel like the glazing bead channel 206 (FIG. 2), the inside of the channel will cool slower than the outside of the same channel resulting in a low CER. If the part exits the metal ridge 318 of the bottom half 300 of the calibrator 302 prior to this section of the profile 200 (FIG. 2) reaching a temperature below Tg, then the high Coefficient of Thermal Expansion of the plastic will cause the plastic on the inside of the channel 206 to shrink and attempt to pull the channel 206 closed as shown in FIG. 5. FIG. 5 illustrates a profile 200 having a channel 206 that has partially closed. The force of the shrinking plastic on the inside of the channel 206 applies an addition drag force on the metal ridge 318 (FIG. 4A) that is holding the channel 206 (FIG. 5) open. The purpose of metal ridge 318 (FIG. 4A) is to hold the channel 206 open until it cools and freezes in the proper shape.

Figure 6C:
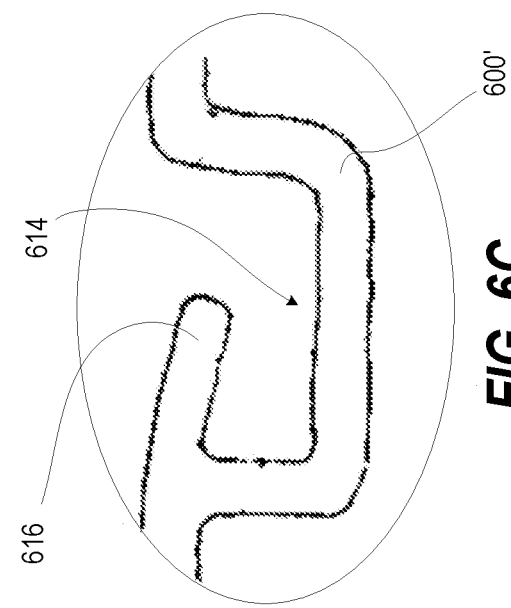
FIG. 6C is an end view detail of the shape of the channel of the slot wall profile of FIG. 6A to receive the mounting bracket when the part exits the metal ridge inside the channel prior to the complete cooling of the part.
Figure 6B:
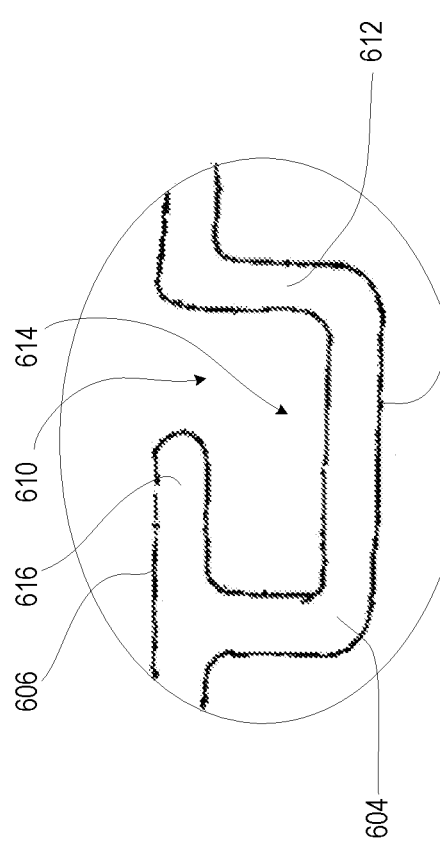
FIG. 6B is an end view detail of the shape of the channel of the slot wall profile of FIG. 6A to receive the mounting bracket as it should appear.
Figure 6A:
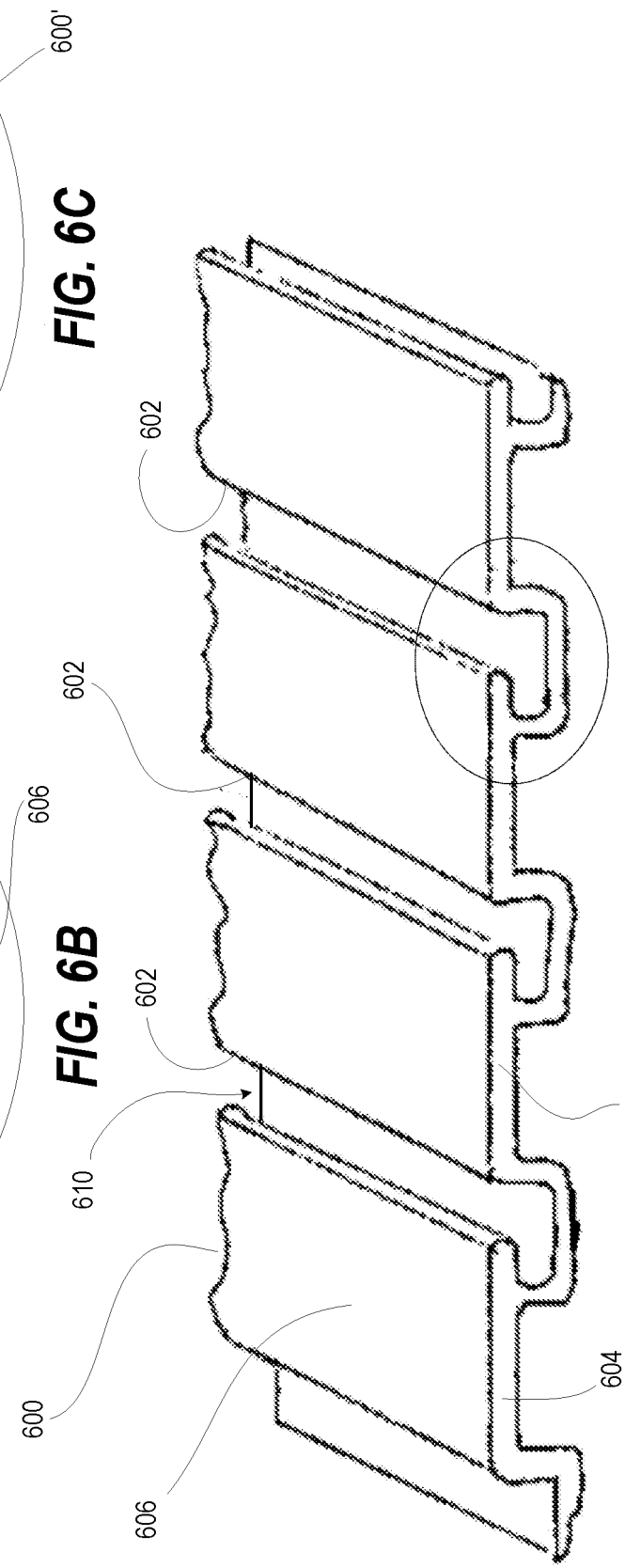
FIG. 6A is a perspective view of a typical plastic slot wall profile.

FIG. 6A shows profile 600 of a plastic slot wall product where the present innovation was first tested. FIG. 6B shows detail of one of the channels 602 in end view. Profile 600 demonstrates that the present innovation is applicable to more extruded products than just complex window lineals. A slot wall product is used in either commercial or residential application where the product is hung on a wall and metal brackets are inserted into channels 602 of the profile in order to display or store various items in a versatile method that can easily be changed. This particular product was made from a foamed, rigid vinyl material by the profile extrusion method. The structural strength of the application requires the very thick walls 604 of the profile which constrain the cooling of this complex part.

Outside surfaces 606 of the profile have contact with the metal of the calibrator that is easily cooled with cooling channels through the calibrator. Although inner channel surfaces 608 have direct contact with the metal ridge in the calibrator, there were no cooling channels installed inside channels 602 in this calibrator and the heat from this section of the plastic profile needed to transfer through the metal ridge filling the relatively narrow gap 610 into the broader calibrator that was cooled by cooling channels. Since no cooling channels were installed inside channels 602 in this calibrator the resulting CER was about 0.20. The thick flange of material 616 forms a very important gap 614 whose opening dimension is critical because the fit of the metal brackets must be uniform, snug but not too tight.

Figure 7:
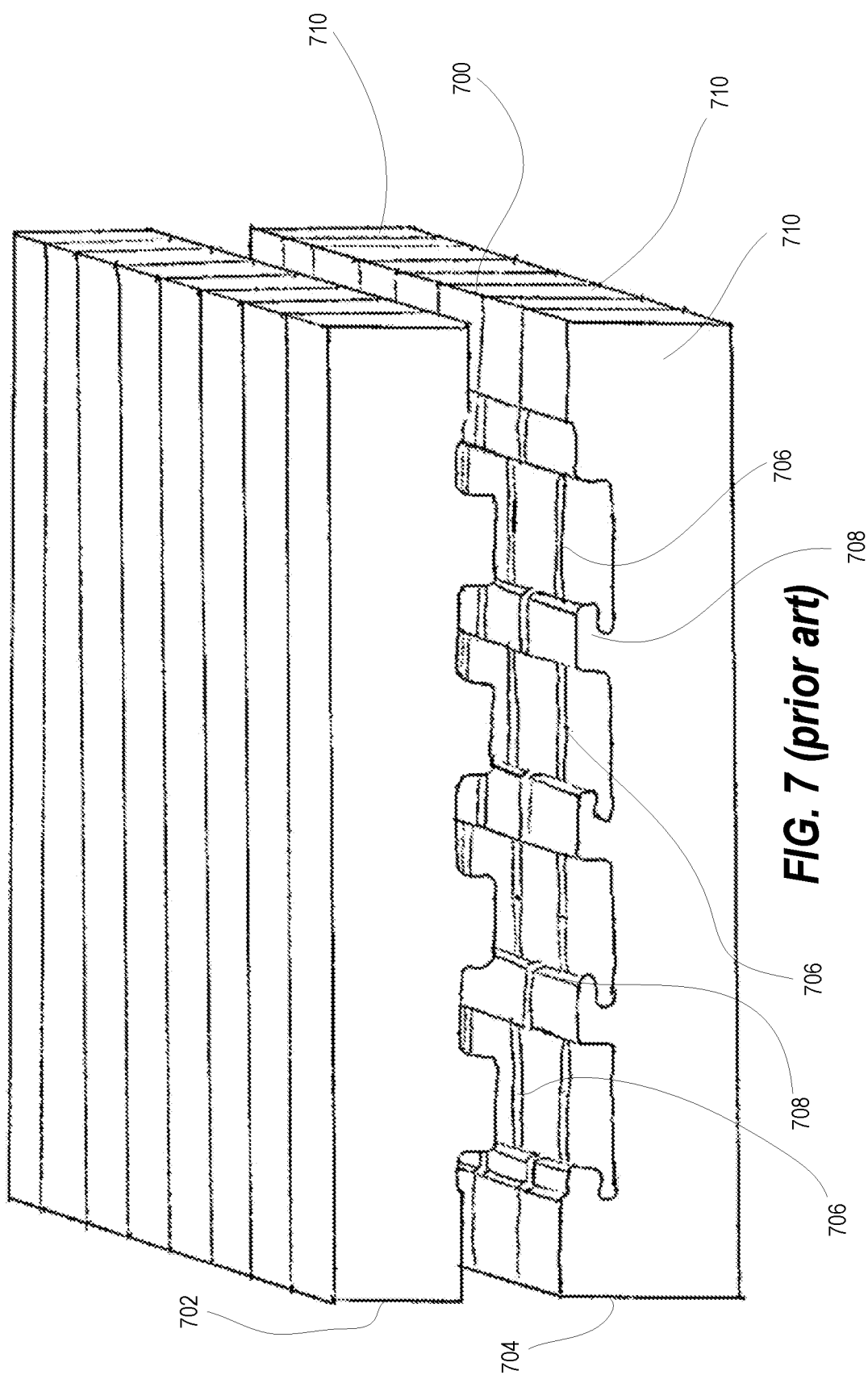
FIG. 7 is a perspective view of the calibrator built with prior art to shape the slot wall profile of FIG. 6A.

FIG. 7 illustrates a generally-known initial calibrator 700 in an open configuration to produce a slot wall profile 600' (FIG. 6B) that lacks the benefits of the present innovation. The hot plastic exiting the extrusion die would enter the gap between top section 702 and bottom section 704 from the rear where the partial vacuum would pull the plastic into contact with the metal of the calibrator to be sized in the passageway and exit at the front of this illustration. When the top and bottom sections are closed the gap forms a through passageway that matches the desired plastic profile size and shape. Slots 706 are cut in a cross-flow direction in both the top and bottom sections to allow a partial vacuum to be applied to hold the cooling plastic against the metal surfaces of the calibrator. Three identical calibrators where built, each 12" long and used in series. Metal ridges 708 run the longitudinal length to create the critical gap 614 (FIGS. 6B-6C) and are included in each metal plate 710 of the bottom section 704.

When the tooling was first tested at the desired output rate, the resulting profile appeared as in FIG. 6C. This is what happens when the part 600' exits the calibrator prior to inner channel surfaces 608 have not cooled to below Tg of the material. Utilizing this tooling built with prior art the line speed had to be slowed to about 2.5 feet per minute to allow flange 616 to cool sufficiently inside the calibrator to freeze and not reduce the dimension of critical gap 614 (FIGS. 6B-C). Any higher speed would result in the gap dimension to be out of tolerance in proportion to the increase in line speed. Even at this low line speed the drag force on the part caused by the flange 616 attempting to close in on the metal ridge in gap 614 was sufficiently high to cause problems such as slipping in the Haul-off, chatter on the part, and the part jamming up and requiring re-stringing the line. The time to cool the thick walls was not sufficient at the desired output rate. The inner channel surfaces 608 cooled slower and as they shrank they pulled the flange 616 down and closed the critical gap 614 in an unacceptable manor. The obvious solution was to slow the output to allow more cooling time. One alternate solution was to build additional calibrators to allow the same cooling time at a higher rate, however, the drag on the part was already high enough to cause a problem.

Another alternative was to add cooling channels into the metal ridges filling channels 602 but this was deemed too expensive and would take too long.

Another alternative was attempted to be able to increase the output rate. Between the first and second calibrator and also between the second and third calibrator, streams of cooling water were directed into each of the channels 602. This improved the cooling inside the channels and allowed a slight increase in output while maintaining the dimension of the critical gap 614.

Surprisingly, it also reduced the drag slightly and reduced the problems associated with the high drag. This led to the non-obvious idea of replacing the metal ridges inside the channels 602 as the method to define and control the shape of critical gap 614 with the idea of controlling the gap by selective and controlled cooling.

Figure 8:
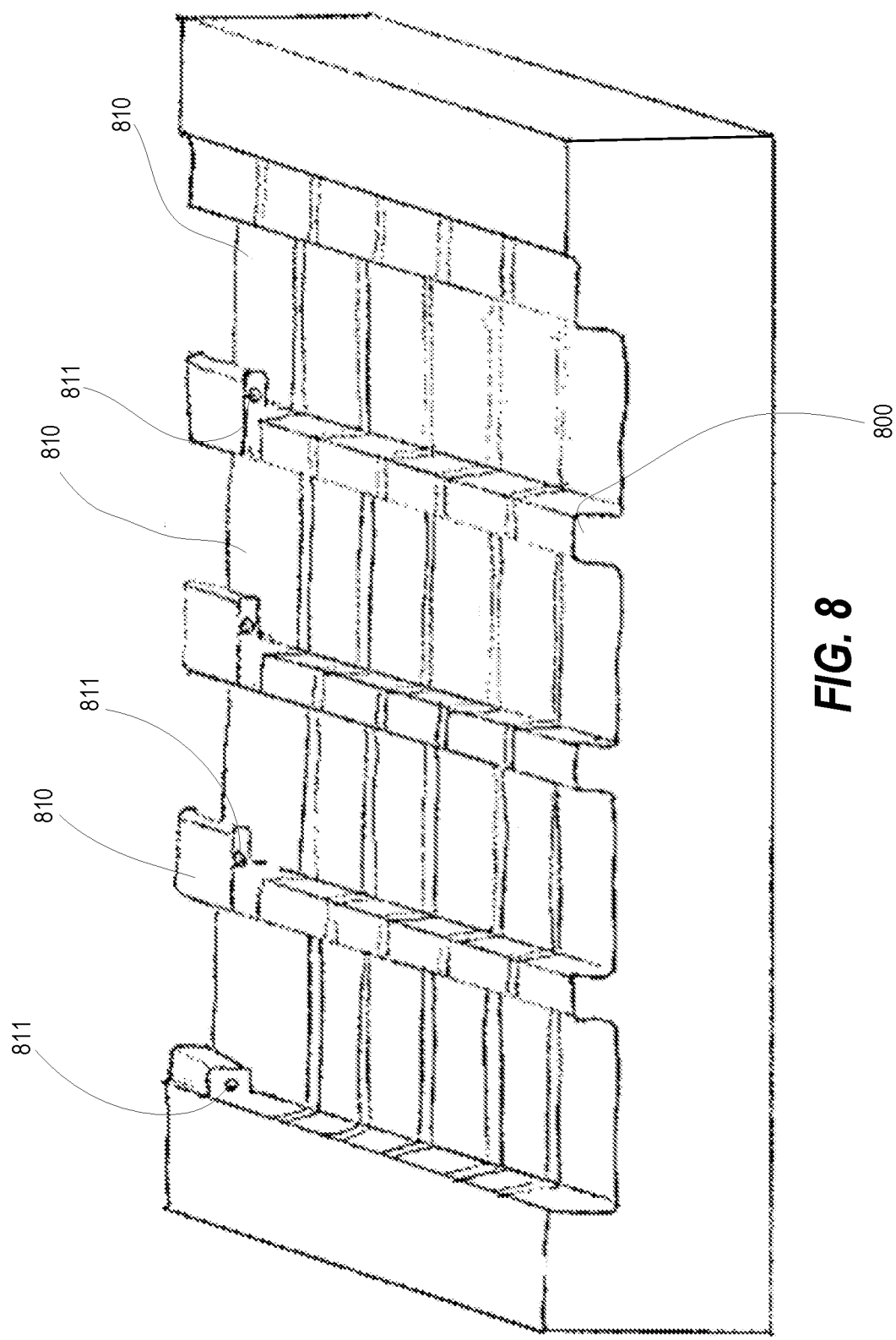
FIG. 8 is a perspective view of an example calibrator to produce the profile of FIG. 6A having a reduced length of metal ridges to produce the fluid cooling passages according to one or more embodiments.

In order to increase the line speed and reduce drag, a calibrator 800 was modified utilizing the current innovation as shown in FIG. 8. Metal ridge 808 setting the critical gap 614 (FIGS. 6B-6C) was removed in all but the first metal plate 810 of the calibrator 800 to create a flow passage for cooling medium and a hole 811 was cut into the existing cooling channels to allow a stream of cooling medium to fill the fluid cooling passage left by the removed metal ridge. With this modification the inner channel surfaces 608 (FIGS. 6B-6C) were cooled more efficiently and no longer contracted to reduce the critical gap 614 and apply pressure onto the metal ridge of the calibrator. As a result, the line speed was increased to 5 feet per minute and the critical gap 614 (FIGS. 6B-6C) was held to the required tight tolerance by adjusting the flow of cooling media as necessary. In addition, the drag on the part was reduced to a point that slipping in the Haul-off was no longer a problem, no chatter was experienced, and the line required re-stringing less often. The line speed could not be raised any further due to the limitation of the extruder output which means that the cooling and sizing of the plastic part was no longer the limitation on line speed for this part. Although it was assumed that the cooling rate would have to be controlled by the flow rate of cooling medium or perhaps the temperature of the water, what was unexpectedly discovered was that as long as the flow of cooling medium was high enough so that the inner channel surfaces 608 cooled faster than surfaces 606 the tolerance of the critical gap 614 (FIGS. 6B-6C) was controlled. By cooling the inner channel surfaces 608 faster, as the surfaces 606 cooled they would want to pull the critical gap 614 open, however, the metal of the calibrator 800 would prevent the gap from opening up.

Figure 9:
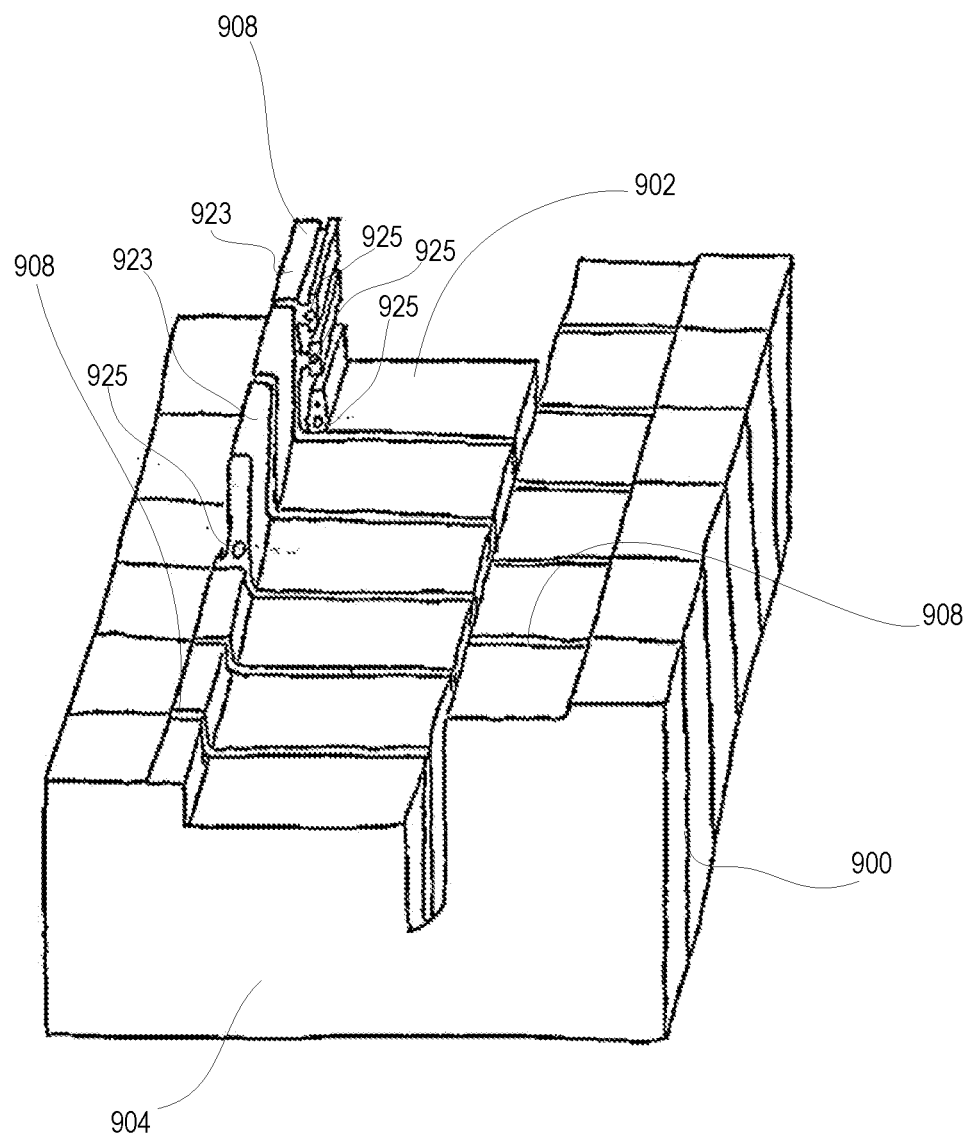
FIG. 9 is a perspective view of an example calibrator to produce the window sash profile of FIG. 2 having reduced length of metal ridges to produce the fluid cooling passages according to one or more embodiments.

FIG. 9 is a perspective view of a calibrator 900 that improves upon the generally-known calibrator 300 (FIG. 3) to make a profile 200 (FIG. 2) as a window sash member. This illustration is a rear view where the hot plastic material would enter from the far side 902, contact the calibrator 900 to be sized in the passageway, and exit at the front 904 of this illustration. Slots 908 are cut in a cross-flow direction as discussed previously to allow a partial vacuum to be applied to hold the cooling plastic against the metal surfaces of the calibrator. The metal ridge 908 that forms channel 206 in the profile 200 (FIG. 2) of the sash member is only added in the first metal plate 910 of this illustration in order to create a fluid cooling passage through the remainder of the calibrator. It is possible to remove this metal ridge 908 all together and replace it with cooling medium, however it is used in this example for the very practical reason of forming a dam to prevent the cooling medium from flowing counter to the profile direction back onto the hot extrusion die. Likewise, metal ridges 912 that form channels 212 (FIG. 2) in the sash member are only added in the first metal plate 910 in order to create a fluid cooling passage through the remainder of the calibrator. The metal ridge 923 that forms channel 222 (FIG. 2) in the sash member is added in three metal plates 910 of this illustration to point out the versatility of the current innovation that allows for adjusting the amount of cooling as needed by the complexity of the plastic profile being produced. Small gap 222 (FIG. 2) is more open and is less difficult to cool that channels 206 or 212 (FIG. 2) so the metal ridge 923 can be replaced by flow passages and cooling medium further down the process. In each case where the metal ridge is stopped early in the flow direction of the calibrator 900 a hole 925 or channel is added to supply cooling medium to come in contact with the hot plastic material and in a preferred embodiment fill the flow passage. This hole 925 or channel is connected to a supply line or channel of cooling media preferably with its own control mechanism so that the flow to each open flow passage in the calibrator 900 can be adjusted as needed to control the amount of flow which controls the amount of cooling and therefore shrinkage and dimensions. In the preferred embodiment where the flow passage is completely filled with the cooling medium the location of the opening into the flow passage is not critical. If the flow passage is not completely filled with the cooling medium, then it is preferred to locate the hole or channel in a way to direct the flow of the cooling medium to contact the hot plastic material preferably at inside corners or other hard to cool locations. In a preferred embodiment the opening should be placed to direct the flow of cooling media in the same direction as the plastic profile is traveling.

In the preferred embodiment the first plate of a calibration device would have the through passageway cut to match the actual profile shape with metal ridges in place to hold channels in the fluid plastic open. Subsequent plates would be cut with the through passageway matching the profile shape with the metal ridges removed to create a fluid cooling passage between the metal of the calibration device and the inside of the channel in the plastic profile. A hole or channel would be cut into the downstream side of the metal ridge and connected to a source of cooling medium to allow the cooling medium to flow into the passage and contact the hot, unfrozen plastic material inside the channel. Thus cooling the inside channel of the plastic profile much more efficiently than is possible by heat conduction into and through the metal ridge. It can be imagined that a metal ridge could be removed from all of the plates in a calibration device and the cooling medium could be introduced to the created flow passage at the entrance to the passage. This is possible as long as the velocity of the flow is sufficient to prevent the back flow of cooling medium hitting the hot extrusion die and cooling it.

It is possible to use the current invention in areas where the cooling rate is only slightly more difficult than fully exposed exterior surfaces of the plastic profile. In the sash profile of FIG. 2 the cooling rate of the glazing bead channel 206 and the weather-strip channels 212 control the cooling rate because they are so difficult to cool. However, if the current invention is used to improve the cooling efficiency of these sections the output rate can be increased significantly. At the higher output rate the cooling of inside corners of this profile 200 formed by the lifting rail 202 and 200 formed by the inside surfaces of the glazing channel 204 will become the controlling factor in increasing output rates. The CER of these sections may only be about 0.70 but the current invention could then be applied to those areas by replacing the metal forming the inside corner with a flow passage to allow cooling medium to more efficiently cool these sections. Since less aggressive cooling is required, these cooling flow passages could be built toward the end, as an example, the final 10% of the length of the first calibration device or only in a second calibration device in a series.

Figure 10:
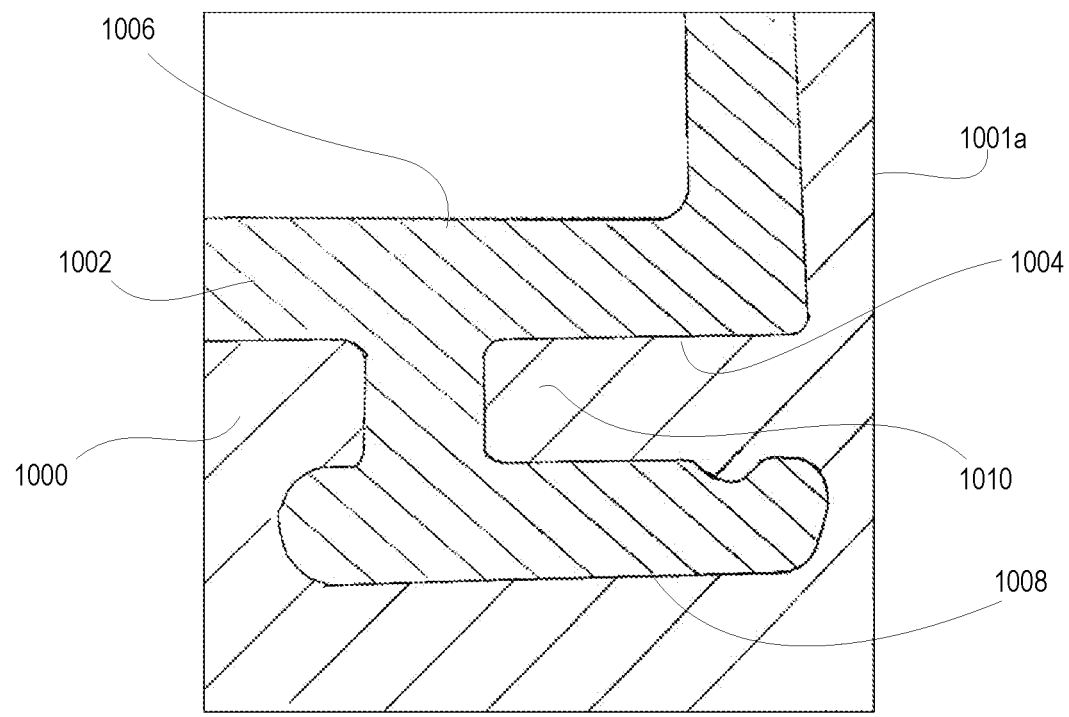
FIG. 10 is a cross sectional view of a lower calibration device 1000 at a selected longitudinal position.

FIG. 10 is a cross sectional view of a lower calibration device 1000 at a selected longitudinal position 1001*a* that receives a hot extruded plastic part 1002 that includes an interior channel 1004 between a main body 1006 and a right-angle extension 1008 that serves as a bead channel. A metal ridge 1010 of the lower calibration device 1000 extends into the interior channel 1004 of the plastic part 1002. Metal ridge 1010 can serve to define the interior channel 1004 or direct cooling fluid flow within the lower calibration device 1000 either upstream or downstream to the selected longitudinal position.

Figure 11:
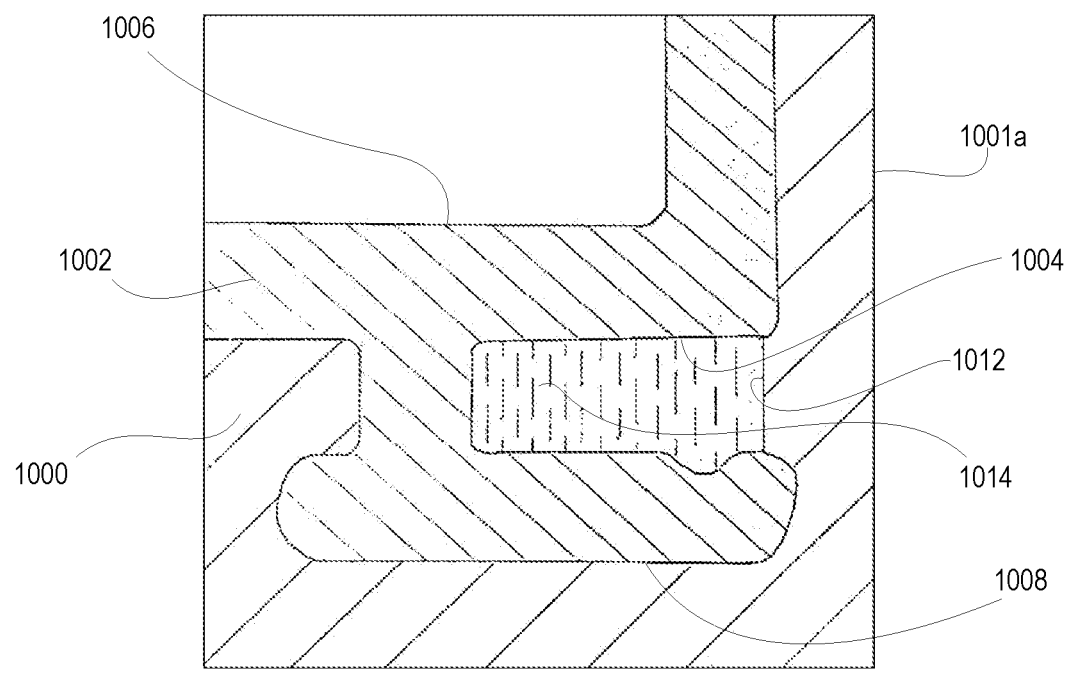
FIG. 11 is a cross sectional view of the lower calibration device 1000 at another selected longitudinal position.

FIG. 11 is a cross sectional view of the lower calibration device 1000 at another selected longitudinal position that receives the hot extruded plastic part 1002 that includes the interior channel 1004 between the main body 1006 and the right-angle extension 1008 that serves as a glazing bead channel. The metal ridge 1010 (FIG. 10) of the lower calibration device 1000 is not present. Instead a portion of a fluid flow passage 1012 extends through the interior channel 1004 of the plastic part 1002. Cooling fluid 1014 that is directed through fluid flow passage 1012 has sufficient pressure to hold or control the shape of a solid. Removal of the metal ridge 1010 (FIG. 10) reduces friction between lower calibration device 1000 and the hot extruded plastic part 1002. Cooling fluid 1014 can rapidly cool plastic part 1002, reducing a required longitudinal length of lower calibration device 1000. With extended contact and cooling between glazing bead interior channel 1004 and metal ridge 1010 (FIG. 10), interior channel 1004 would tend to close up as it cools grabbing onto the metal ridge 1010 (FIG. 10) of the lower calibration device 1000. However, the longitudinal length of the selected longitudinal position having metal ridge 1010 (FIG. 10) can be sufficient short to avoid this effect. Substituting fluid pressure and cooling of fluid flow passage 1012 for metal ridge 1010 (FIG. 10) ensures that metal ridge 1010 (FIG. 10) does not grab the plastic part 1002 and more importantly changes the cooling so that the inside of internal channel 1004 freezes first and the internal channel 1004 will actually tend to open up against the outer surface of the lower calibration device 1000. This pressure on the outer surface improves cooling efficiency by increasing conduction and constrains the shape plastic part 1002 to the desired dimensions.

In one aspect, the present innovation provides a calibration device for the sizing of plastic profiles that allows for the selective cooling of certain sections of the profile by including the following: (a) Replacing the metal ridge(s) from strategic locations that would normally act to control the shape or dimensions of channel(s) of the plastic part with the introduction of a flow of a cooling medium into that space to improve the cooling of that section of the plastic part; and (b) Allowing for the control of the amount of cooling by varying the location, the velocity and/or temperature of the cooling medium introduced into that section of the plastic part in order to control the shrinkage rate and resulting dimensions of the final part.

In one or more embodiments, the cooling medium is water. In one or more embodiments, the cooling medium is glycol-based coolant including ethylene glycol, propylene glycol coolants with or without water mixtures. In one or more embodiments, the cooling medium is fluid nitrogen. In one or more embodiments, the cooling medium is chilled air.

In one or more embodiments, the cooling medium is in turbulent flow to increase the cooling rate. In one or more embodiments, the flow of the cooling medium is controlled by throttling the flow rate of the cooling medium to control the cooling rate. In one or more embodiments, the cooling effect on the profile of the cooling medium is controlled by adjusting the temperature of the cooling medium to control the cooling rate. In one or more embodiments, the metal ridge replaced in the calibrator includes a short section at the entrance to the calibrator so that the cooling medium does not flow counter to the profile and back against the hot die. In one or more embodiments, 100% of the metal ridge is replaced in the calibrator and a fixture is added to the front of the calibrator to allow the introduction of the cooling medium into the fluid cooling passage of the plastic part at the entrance to the calibrator so that the cooling medium does not flow counter to the profile and back against the hot die. In one or more embodiments, the flow of cooling medium is introduced at the entrance to the calibrator in order to maximize the increase in cooling efficiency. In one or more embodiments, the flow of cooling medium is introduced toward the exit of the calibrator in order to gain a slight increase in cooling efficiency. In one or more embodiments, the flow of cooling medium is introduced at a location within the calibrator in order to gain a level of increase in cooling efficiency predetermined by experience or calculation.

In one aspect of the present innovation, a method of manufacturing of plastic profile is provided that allows for the selective cooling of certain sections of the profile by including the following: (a) Selectively replacing the metal ridge(s) from strategic locations that would normally act to control the shape or dimensions of channel(s) of the plastic part with introducing a flow of a cooling medium into that space to improve the cooling of that section of the plastic part; and (b) Controlling the overall cooling rate of that section of the profile by varying the location, the velocity and/or temperature of the cooling medium introduced into that section of the plastic part in order to control the shrinkage rate and resulting dimensions of the final part.

In one or more embodiments, the cooling medium is water. In one or more embodiments, the cooling medium is fluid nitrogen. In one or more embodiments, the cooling medium is chilled air. In one or more embodiments, the cooling medium is in turbulent flow to increase the cooling rate. In one or more embodiments, the flow of the cooling medium is controlled by throttling the flow rate of the cooling medium to control the cooling rate. In one or more embodiments, the cooling effect on the profile of the cooling medium is controlled by adjusting the temperature of the cooling medium to control the cooling rate. In one or more embodiments, the metal ridge replaced in the calibrator includes a short section at the entrance to the calibrator so that the cooling medium does not flow counter to the profile and back against the hot die. In one or more embodiments, 100% the metal ridge is replaced in the calibrator and a fixture is added to the front of the calibrator to allow the introduction of the cooling medium into the fluid cooling passage of the plastic part at the entrance to the calibrator so that the cooling medium does not flow counter to the profile and back against the hot die. In one or more embodiments, the flow of cooling medium is introduced at the entrance to the calibrator in order to maximize the increase in cooling efficiency. In one or more embodiments, the flow of cooling medium is introduced toward the exit of the calibrator in order to gain a slight increase in cooling efficiency. In one or more embodiments, the flow of cooling medium is introduced at a location within the calibrator in order to gain a level of increase in cooling efficiency predetermined by experience or calculation.

In one aspect of the present disclosure, a calibration device is provided for the sizing of extruded plastic profiles that allows for the selective cooling of certain sections of the profile that are difficult to cool by traditional means. In one or more embodiments, the calibration device comprises a flow passage through at least a portion of the calibration device in one or more strategic locations prior to the freezing of the plastic in that specific location with at least one side or section of the flow passage being defined by a part of the stationary calibration device and at least one side or section of the flow passage being defined by the unfrozen plastic material moving through the calibration device. The calibration devices comprises at least one entry port for the flow of cooling medium to enter the flow passage and contact the unfrozen plastic material in order to freeze the shape or dimensions of that location of the plastic part prior to the other sections in contact with the metal of the calibrator device.

In one aspect of the present disclosure, the calibration device further comprises a cooling control system that controls the amount of cooling within the flow passage to match the cooling of the calibrating device outside the flow passage by varying at least one of: (i) location within the calibration device where the cooling medium is introduced; (ii) flow rate of the cooling medium; and (iii) temperature of the cooling medium introduced into that section of the calibration device, in order to control the shrinkage rate and resulting dimensions of a final part.

In another aspect of the present disclosure, a method is provided for the selective cooling of certain sections of an extruded plastic profile within a calibration device. The method includes use of a calibration device with a flow passage in one or more strategic locations within the calibration device through at least a portion of the calibration device that begins prior to the freezing of the plastic in that specific location with at least one side or section of the flow passage being defined by a part of the stationary calibration device and at least one side or section of the flow passage being defined by the unfrozen plastic material moving through the calibration device. The method includes introduction of a flow of cooling medium into the flow passage within the calibration device to contact the unfrozen plastic material in order to freeze the shape or dimensions of that location of the plastic part; and or separate claim.

In an additional aspect of the present disclosure, a method is provided that controls the amount of cooling within the flow passage to match the cooling of the calibrating device outside the flow passage by varying at least one of: (i) location within the calibration device where the cooling medium is introduced; (ii) flow rate of the cooling medium; and (iii) temperature of the cooling medium introduced into that section of the calibration device, in order to control the shrinkage rate and resulting dimensions of a final part.

For purposes of the present disclosure, a calibration device is defined as the stationary tool that captures the hot, fluid plastic exiting from a profile extrusion die with the purpose of holding and controlling the shape and dimensions of the plastic material as it moves through the tool in the continuous profile extrusion process.

Sizing is defined as the act of controlling the shape and dimensions of the plastic material as it cools from the fluid, melt stage as extruded until it is frozen and rigid enough to retain its shape and dimensions without external support.

Freezing or frozen is defined in the traditional meaning when applied to plastics, where the plastic material is in a fluid state and by reducing the temperature to below the Tg or melt point of the plastic, the material becomes a solid where it retains its shape and dimensions without external support.

According to aspects of the present innovation, it is not critical to control the exact temperature and amount of thermal transfer of the cooling. As long as inside the channel (where the metal ridge would be to prevent the channel from closing in) cools first, the plastic will want to open up the channel but is prevented by the metal outside surrounding the channel.

In one or more embodiments, control is possible by: (i) Controlling the flow rate of water (or cooling medium) with a ball valve, or adjustment of any water valve. If the channel closes in, increase the flow rate, and as long as it doesn't close in, the flow rate is sufficient. Manual control is sufficient. (ii) Controlling the temperature of water (or cooling medium). Generally-known temperature control units that are commonly used in the plastic process industry can be employed. (iii) According to aspects of the present innovation, location of the introduction of the cooling medium can be selected. The introduction of cooling medium inside the first calibrator where needed to balance out the cooling rate. The CER can be used as an estimate of where cooling medium should be introduced with a rule of thumb being that the CER determines the percentage of the calibration device that should incorporate the metal ridge rather than the fluid cooling passage—CER=0.1 should be 10% metal ridge and 90% fluid cooling passage, while CER=0.7 should be 70% metal ridge and 30% fluid cooling passage, while CER=1.0 should be 100% metal ridge. It may be possible to calculate more accurately the cooling rate around the complex profile to determine where and when additional cooling is needed. Even without additional analysis, it has been observed that as long as the inside channels are cooled first the channel expands out against the outside surfaces of the calibrator.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A plastic extrusion calibration device comprising:
a calibration body having a longitudinal cavity defined by interior walls of the calibration body and which has a cross-sectional size and shape of a plastic profile to be sized in the device, that is shaped to receive, maintain a shape of, and to conductively cool, an unfrozen plastic profile, received from a profile extrusion die positioned upstream of the calibration body, that passes through the longitudinal cavity;
one or more ridges of the calibration body formed along a longitudinal length of the longitudinal cavity, having an upstream end positioned adjacent to the profile extrusion die to define a channel in the unfrozen plastic profile, and having a downstream end that defines an upstream edge of a fluid cooling passage within the longitudinal cavity and having a Cooling Efficiency Ratio (CER) less than 1;
the fluid cooling passage formed in the calibration body and having a portion that communicates with the longitudinal cavity, exposing a surface of the unfrozen plastic profile with cooling media to freeze a surface of the profile, wherein the cooling media is moving at a velocity sufficient to remove heat from the plastic profile and to control shape and dimensions of a plastic channel; and
an input fluid cooling port that receives the cooling media that passes through the fluid cooling passage,
wherein the longitudinal cavity is adapted for at least partially frozen plastic profile to exit the device being drawn through the calibration body.

2. The plastic extrusion calibration device of claim 1, wherein the device further comprises the profile extrusion die positioned upstream of the calibration body and configured to extrude unfrozen plastic as the unfrozen plastic profile and wherein a proportion of the longitudinal cavity occupied by the fluid cooling passage in relation to the one or more ridges is proportional to the Cooling Efficiency Ratio (CER).

3. The plastic extrusion calibration device of claim 1, wherein the calibration body further comprises at least one vacuum passage formed in the calibration body and having a portion that communicates with the longitudinal cavity to facilitate drawing at least a partial vacuum for holding unfrozen plastic material to a desired shape as the unfrozen plastic material cools.

4. The plastic extrusion calibration device of claim 1, wherein the device further comprises a source of pressurized cooling media.

5. The plastic extrusion calibration device of claim 4, wherein the cooling media is selected from the group consisting of air, water, fluid nitrogen, and a glycol-based coolant.

6. The plastic extrusion calibration device of claim 4, wherein the cooling media is a glycol-based coolant selected from the group consisting of ethylene glycol, propylene glycol and aqueous mixtures thereof.

7. The plastic extrusion calibration device of claim 4, wherein the cooling media is in turbulent flow to increase a cooling rate.

8. The plastic extrusion calibration device of claim 4, wherein the input fluid cooling port is positioned at a front of the calibration body to allow an introduction of the cooling media into the fluid cooling passage of the plastic part at an entrance to the calibration body such that the cooling media does not flow counter to the profile.

9. The plastic extrusion calibration device of claim 8, wherein the device controls an amount of cooling within a flow passage to match a cooling of the calibrating device outside the flow passage by varying at least one of: (i) location within the calibration device where the cooling media is introduced; (ii) flow rate of the cooling media; and (iii) temperature of the cooling media introduced into that section of the calibration device, in order to control a shrinkage rate and resulting dimensions of a final part.

\* \* \* \* \*